United States Patent [19]

Martin et al.

[11] Patent Number: 4,815,166
[45] Date of Patent: Mar. 28, 1989

[54] METHOD AND APPARATUS FOR PROCESSING TURKEY GIZZARDS

[75] Inventors: Eugene G. Martin, New Holland, Pa.; Michael E. Lease, Delmar, Del.; Dale M. Risser, Salisbury, Md.

[73] Assignee: FoodCraft Equipment Company, Lancaster, Pa.

[21] Appl. No.: 145,823

[22] Filed: Jan. 19, 1988

[51] Int. Cl.4 .............................................. A22C 21/00
[52] U.S. Cl. ............................................ 17/51; 17/11; 17/21
[58] Field of Search ..................... 17/11, 21, 45, 51, 52

[56] References Cited

U.S. PATENT DOCUMENTS

| | | |
|---|---|---|
| 2,455,675 | 12/1948 | Hawk . |
| 2,695,418 | 11/1954 | Patterson et al. . |
| 2,726,421 | 12/1955 | Strickler . |
| 3,175,244 | 3/1965 | Sharp et al. . |
| 3,579,714 | 5/1971 | Edwards, Sr. . |
| 3,590,421 | 7/1971 | Loth et al. . |
| 3,624,669 | 11/1971 | Lewis . |
| 3,802,028 | 4/1974 | Scheier et al. . |
| 3,990,128 | 11/1976 | Van Mil . |
| 4,004,320 | 1/1977 | Scheier et al. . |
| 4,057,875 | 11/1977 | Hill . |
| 4,073,040 | 2/1978 | Hill . |
| 4,074,390 | 2/1978 | Meyn . |
| 4,183,117 | 1/1980 | Meyn . |
| 4,203,178 | 5/1980 | Hazenbroek . |
| 4,249,284 | 2/1981 | Graham et al. . |
| 4,302,867 | 12/1981 | Hill . |
| 4,306,333 | 12/1981 | DeLong . |
| 4,325,165 | 4/1982 | DeLong . |
| 4,382,313 | 5/1983 | Harben, Jr. et al. . |
| 4,395,795 | 8/1983 | Hazenbroek . |
| 4,434,526 | 3/1984 | Van Mil . |
| 4,466,158 | 8/1984 | DeLong . |
| 4,516,290 | 5/1985 | Van Mil . |
| 4,524,489 | 1/1985 | Van Mil . |
| 4,528,720 | 7/1985 | Young et al. . |
| 4,538,325 | 9/1985 | Harben, Jr. et al. . |
| 4,570,294 | 2/1986 | Meyn . |
| 4,590,643 | 5/1986 | Hill . |
| 4,691,410 | 9/1987 | Risser et al. . |

Primary Examiner—Willie G. Abercrombie
Attorney, Agent, or Firm—Price, Heneveld, Cooper, DeWitt & Litton

[57] ABSTRACT

A method and apparatus for processing gizzards uses a gizzard splitter, a gizzard defatter and a gizzard peeler. The splitter includes upper and lower conveyors which define pockets for receiving an individual poultry gizzard. The pockets retain the gizzard as it is pushed over a rotating probe. The rotating probe includes a nipple-shaped head which washes foreign matter from the gizzard. The conveyor pockets also pass the gizzard by a rotating knife which slits the gizzard. The splitter includes a spray system for cleaning the upper and lower conveyor assemblies. The gizzard defatter includes a plurality of stationary picker fingers and a rotating frame having picking fingers mounted thereon. The picking fingers engage the gizzards removing fat and other debris. The peeler includes a plurality of sets of helically cut intermeshing gizzard peeler rolls or rollers and a rotating auger. A plurality of pins are positioned on the auger. The pins contact the gizzards and flip them on the gizzard peeler rollers.

41 Claims, 11 Drawing Sheets

METHOD AND APPARATUS FOR PROCESSING TURKEY GIZZARDS

BACKGROUND OF THE INVENTION

The present invention relates to poultry processing and more particularly to a method and apparatus for processing the gizzards of poultry such as turkeys.

In modern poultry processing plants, hundreds of thousands of birds may be handled on a daily basis. To meet these production rates, the processing plants have become highly automated. Various operations are conducted on the birds as they travel through the plant hanging from overhead conveyors. Typically, important internal organs of the poultry, such as gizzards, will be processed separately by hand or on special machines. During such processing, the gizzards are separated from the stomach and entrails. This operation may be conducted by hand or by suitable machinery as the poultry passes on an overhead conveyor. The gizzards must then be cleaned to remove stones, sand and gravel from the interior of the gizzard. Next, the tough, inedible, interior liner of the gizzard must be removed.

During the processing operation, a rotary knife may be employed to cut open the gizzard. Available cutters split the gizzard randomly or through the meaty part of the lobe. A desirable butterfly cut through a tendon leaving the meat intact is not obtained. Further, unless the gizzard interior is clean with the small stones, sand and gravel removed prior to the cutting operation, the rotary knife will become rapidly worn. As a result, various methods have been proposed which direct jets of pressurized water into the interior of the gizzard prior to the cutting operation. Examples of prior gizzard apparatus and processing methods may be found in U.S. Pat. No. 3,590,421 entitled "MACHINE AND METHOD FOR CLEANING AND CUTTING OPEN GIZZARDS OF SLAUGHTERED BIRDS" and issued on July 6, 1971, to Leth et al; U.S. Pat. No. 3,579,714 entitled "GIZZARD PROCESSING DEVICE" and issued on May 25, 1971, to Edwards, Sr.; U.S. Pat. No. 3,175,244 entitled "METHOD OF PROCESSING GIZZARDS IN FOWLS" and issued on Mar. 30, 1965, to Sharp et al; U.S. Pat. No. 3,624,669 entitled "POULTRY GIZZARD PROCESSING MACHINE" and issued on Nov. 30, 1971, in the name of Lewis; and U.S. Pat. No. 4,538,325 entitled bGIZZARD HARVESTING MACHINE" and issued on Sept. 3, 1985, in the name of Harben et al.

Another approach uses a pair of opposed conveyors which define cooperating pockets for receiving and holding a gizzard. The conveyor moves the gizzard onto a rotating cone spindle. The spindle washes foreign matter from the gizzard and removes its lining by rotating the lining with respect to the gizzard. The spindle defines washing ports or nozzles at its tip. The gizzard is then passed on for further processing, such as defatting and packaging.

In the processing of poultry gizzards, such as those from turkeys, various problems have been encountered. These include mutilation, insufficient cleaning and reduced production rates. It is desirable to automate the processing operation yet avoid damage to the gizzards as they are cleaned and delined. Prior automated equipment have had excessive wear problems, excessive mutilation problems and excessive maintenance and cleaning problems.

SUMMARY OF THE INVENTION

In accordance with the present invention, a unique method and apparatus are provided which efficiently process poultry gizzards, minimize the rejection rate and maintain the processing rates necessary for present plant operation. Essentially, the apparatus includes a gizzard splitter, a gizzard defatter and a gizzard peeler. The gizzard splitter includes an elongated conveyor upon which the gizzard may be placed. The gizzard is positioned and moved onto a rotating probe which cleans the interior of the gizzard with a high pressure spray. The gizzard is slit by a rotary cutter. The device positions the gizzards so that they are cut through a tendon leaving the muscle intact in a butterfly cut. With the defatter, provision is made for further removal of debris and fat from the slit gizzard. The gizzard peeler includes a plurality of sets of counter-rotating, helically cut, intermeshing gizzard peeler rollers. A separately driven auger is positioned above and extends along the gizzard peeler roller sets. The auger controls the rate of movement of the gizzards along the peeler rollers. In addition, provision is made for flipping the gizzards on the rollers to insure that the tough interior liner is engaged by the peeler rollers and removed. The gizzard peeler assembly includes an inspection table at which finish peeling, if needed, may be conducted.

In narrower aspects of the invention, provision is made for cleaning the conveyors employed in the splitter with high pressure water spray. In addition, provision is made for adjustably mounting the rotary splitter knife and insuring that the gizzards are passed by the knife in a proper fashion.

DETAILED DESCRIPTION OF THE PREFERRED EMBODIMENT

Figure 1:
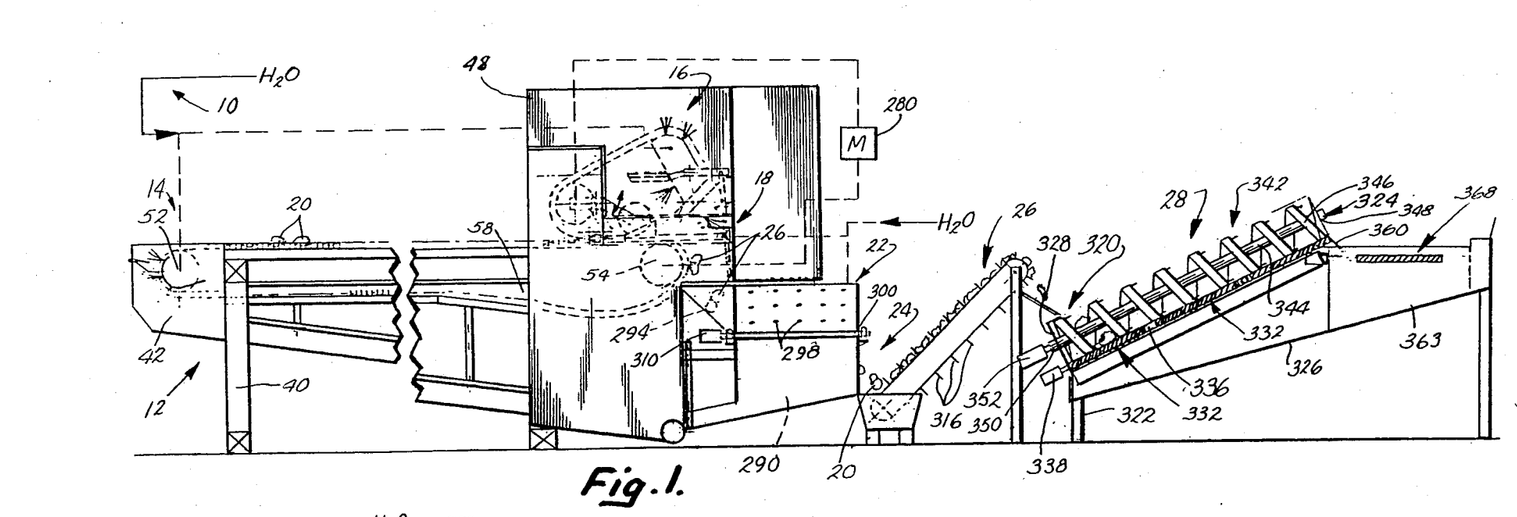
FIG. 1 is a side, elevational view of an apparatus for processing gizzards in accordance with the present invention.

A preferred embodiment of a gizzard processing apparatus in accordance with the present invention is illustrated in FIG. 1 and generally designated by the numeral 10. Apparatus 10 includes a gizzard splitter subassembly or device 12 having a lower conveyor assembly 14, a splitter and cleaning subassembly 16 and a discharge end 18. Gizzards, generally designated by the numeral 20, are discharged from splitter 12 into a defatter 22 which has a discharge 24. Gizzards 20 are discharged from defatter 22 onto a transfer conveyor 26. The gizzards are moved by transfer conveyor 26 to a gizzard peeler 28. In use, workers are stationed along conveyor 14 of splitter subassembly 12. The workers remove gizzards from poultry passing by on a plant overhead conveyor and place them onto conveyor 14. As discussed in detail below, the gizzards are cleaned, split, defatted and the tough interior liner is removed. Relatively efficient and high speed processing of turkey or other poultry gizzards may be achieved employing the apparatus in accordance with the present invention.

GIZZARD SPLITTER SUBASSEMBLY

Figure 2:
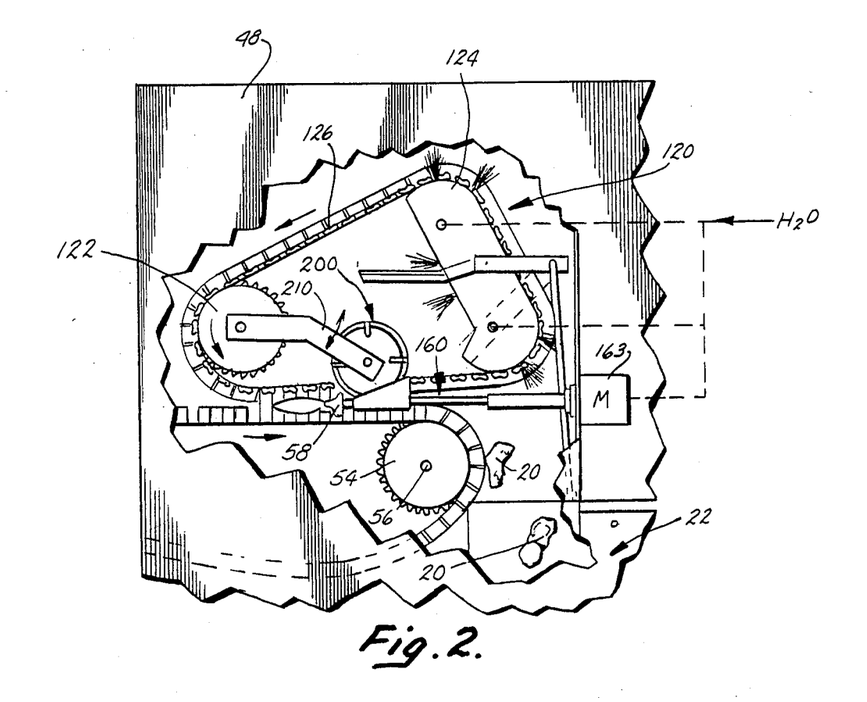
FIG. 2 is an enlarged, fragmentary, side, elevational view of a portion of a gizzard splitter included in the apparatus of FIG. 1.
Figure 3:
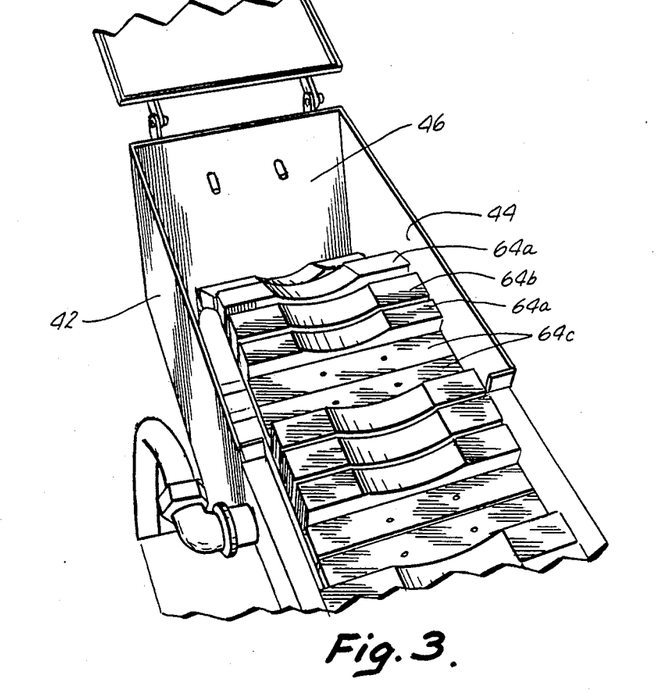
FIG. 3 is a fragmentary, perspective view of a portion of the splitter.

Gizzard splitter subassembly or device 12 as seen in FIGS. 1, 2 and 3 includes a main frame 40 enclosed by suitable panels 42, 44 and 46. Panels 42, 44 and 46 enclose the lower conveyor structure 14. Additional panels 48 enclose the splitter and cleaning subassembly 16. The panels house the operating portions of the splitter to retain the water spray within the device.

Figure 4:
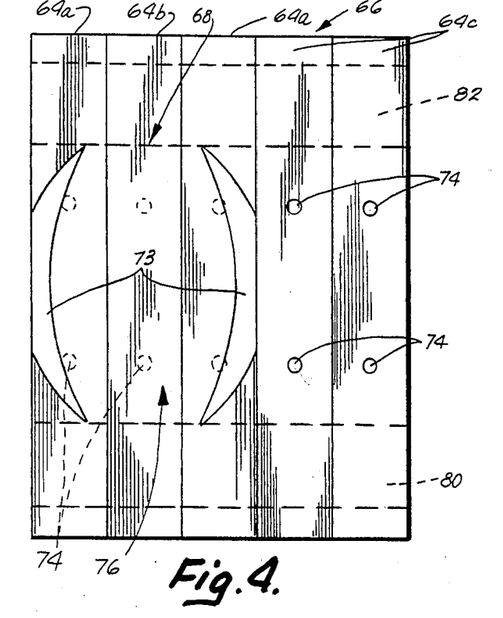
FIG. 4 is a top, plan view of a lower conveyor block set.
Figure 5:
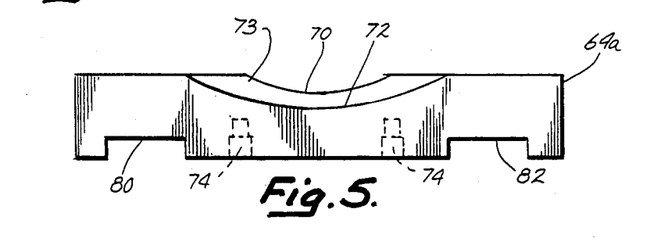
FIG. 5 is a front, elevational view of a block included in the set of FIG. 4.
Figure 6:
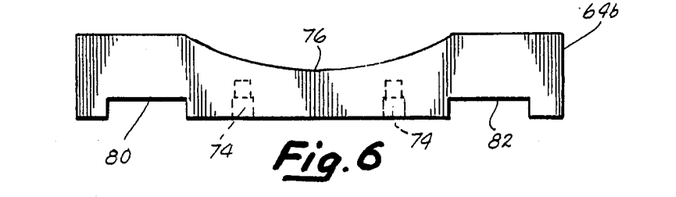
FIG. 6 is a front, elevational view of another block included in the set of FIG. 4.
Figure 7:
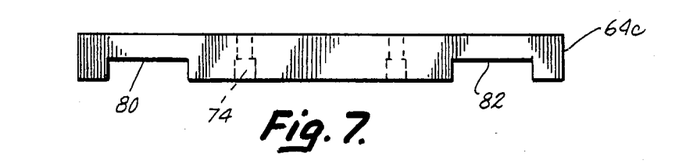
FIG. 7 is a front, elevational view of a third form of block included in the set of FIG. 4.
Figure 8:
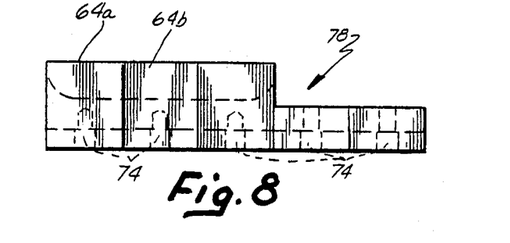
FIG. 8 is a side, elevational view of the block set of FIG. 4.
Figure 10:
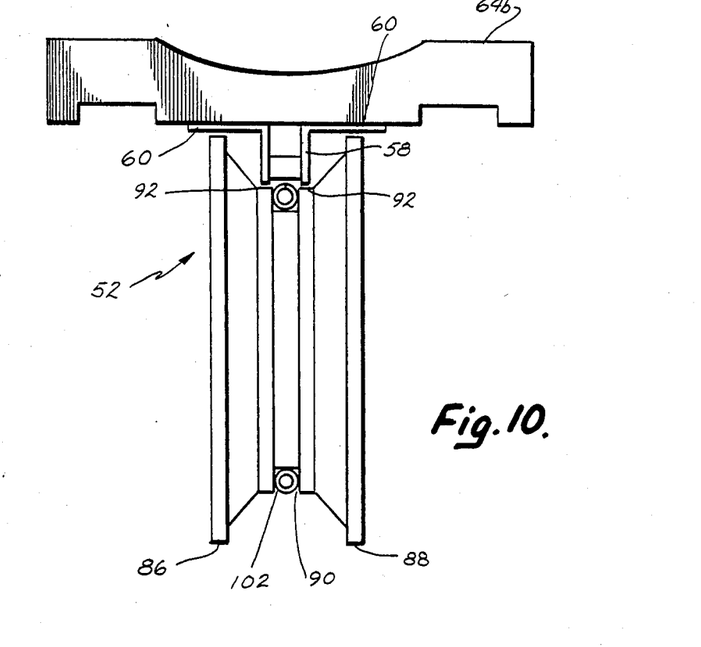
FIG. 10 is an end, elevational view of the forward idler wheel also showing a portion of the conveyor chain and block.
Figure 19:
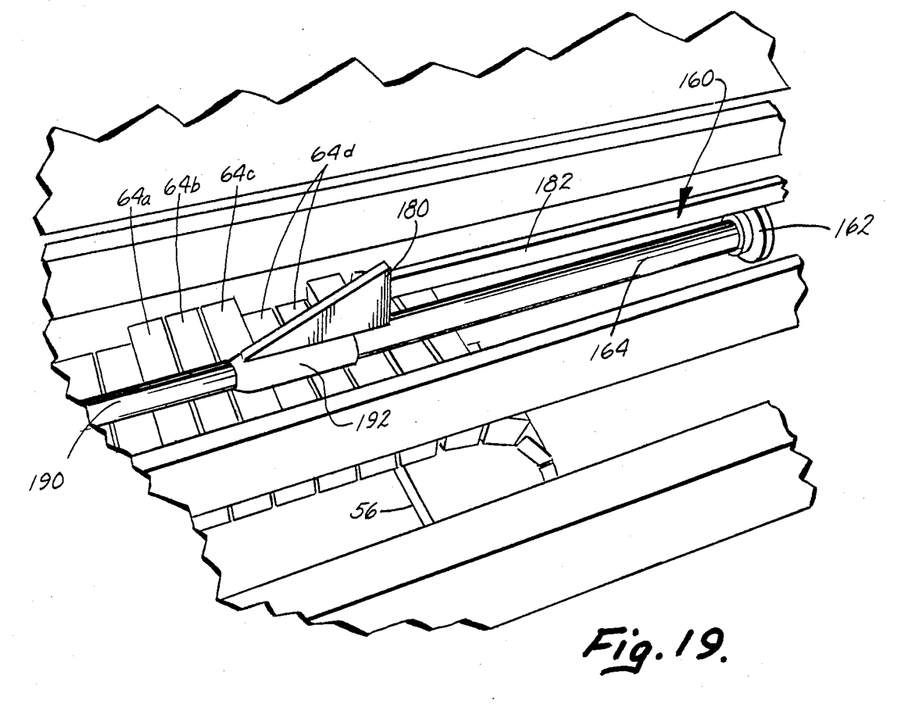
FIG. 19 is a fragmentary, enlarged, perspective view of a portion of the splitter showing a section of the lower conveyor, the rotating probe and the knife guide.

Lower conveyor 14 includes forward idler wheel 52 and a rear sprocket 54 supported on a shaft 56. An endless chain 58, schematically shown in FIG. 1, extends around idler wheel 52 and sprocket 54. Chain 58 as shown, for example, in FIG. 10 includes a "K-1 attachment". The K-1 attachment, which is manufactured by Tsubaki, includes ears 60 formed on the chain links. As seen in FIGS. 3, 10 and 19, individual conveyor blocks or flights 64a, 64b and 64c are attached to ears 60 by suitable fasteners (not shown). Blocks 64a–64c are arranged in sets 66, as seen in FIG. 4. Each set includes two blocks 64a, an intermediate block 64b and a pair of blocks 64c. Blocks 64a and 64b define a gizzard receiving pocket 68. Each block 64a is generally rectangular in top plan view. A central area is milled, as shown in FIGS. 4, 5 and 8, to define a recess. The recess includes an edge 70 and an edge 72 having a radius greater than the radius of edge 70. The block between the edges 70, 72 defines a smoothly curved wall or rear portion of the pocket 73. In an existing embodiment, the radius of edge 70 is 1.75 inches and the radius defining the edge 72 is 3.50 inches. The individual blocks 64a have a height of 1.062 inches and a width of 0.968 inches. The length of the blocks is 6.375 inches. The undersurfaces of the blocks 64a are drilled to define mounting apertures 74. The blocks are formed from a UHMW or equivalent, such as Nylon. The material must be USDA approved for food contact.

Block 64b is of the same general overall dimensions as block 64a. Block 64b defines a curved recess 76. The radius defining the recess 76 is the same as the radius defining edge 72. Finally, blocks 64c have the same width and length dimension as blocks 64a and 64b. Blocks 64c, however, have a height approximately half of that of the remaining blocks of the set. The blocks when arranged as shown in FIGS. 4 and 8 define pocket 68 and a planar recess 78. In addition, each of the blocks or flights 64a–64c are formed with grooves or slots 80, 82. The blocks ride on suitable guides supported on the frame and received within slots 80, 82.

Figure 9:
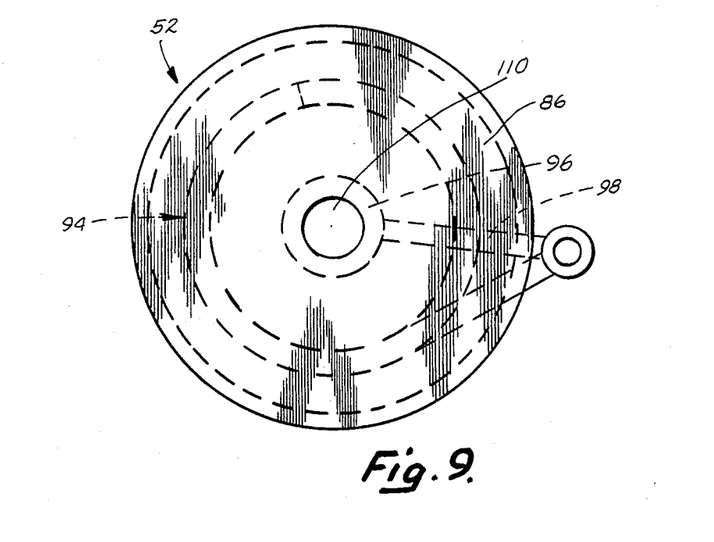
FIG. 9 is a side, elevational view of a forward idler wheel incorporated in the splitter.
Figure 11:
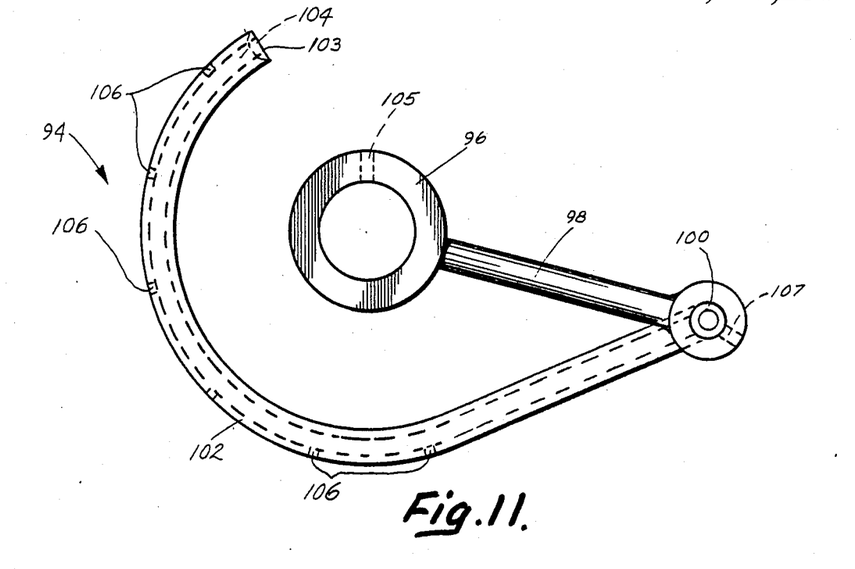
FIG. 11 is a side, elevational view of a spray bar incorporated in the splitter.
Figure 12:
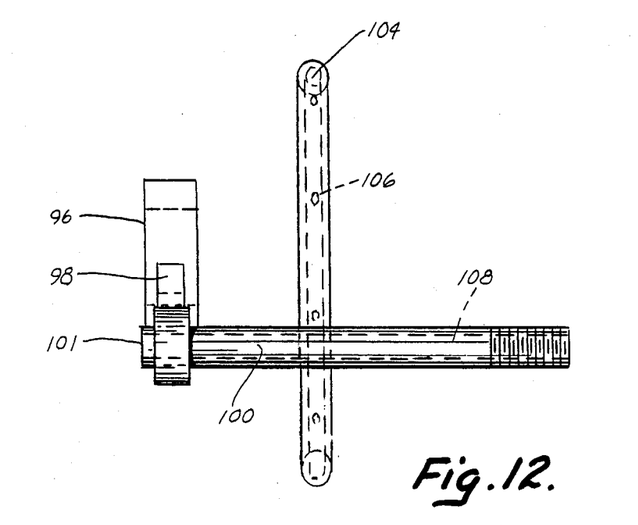
FIG. 12 is an end, elevational view of the spray bar of FIG. 11.

As seen in FIGS. 9 and 10, forward idler 52 has a pulley-like configuration including halves 86, 88. The halves are joined to define a central groove 90. Immediately adjacent groove 90 are shoulders 92 upon which chain 58 rides. Groove 90 is dimensioned to receive a spray bar assembly 94. As seen in FIGS. 11 and 12, the spray bar assembly 94 includes a support hub 96. A mounting bar 98 extends from hub 96 to a hub 99 which receives an inlet tube 100. Tube 100 is plugged at end 101. Extending from a point generally centrally of tube 100 is a spray bar or tube 102 which is plugged at end 103. Tube 102 defines a central passage 104 and a plurality of spray apertures 106. Tube 100 includes a passage 108 which communicates with passage 104. As seen in FIG. 9, support hub 96 is concentric with a central hub 110 of idler wheel 52 when spray tube 102 is positioned within groove 90. Hub 96 is fixed to wheel 52 support shaft by a set screw in bore 105. Bar 102 and tube 100 are adjustable within hub 99 and are fixed by a set screw within bore 107. Passage 108 of inlet tube 100 is connected to a suitable source of water under pressure. In operation, as schematically shown in FIG. 1, water will be sprayed from apertures 106. The spray is positioned and directed to clean the chain 58 and the sets of blocks or flights 64a–64c.

Figure 13:
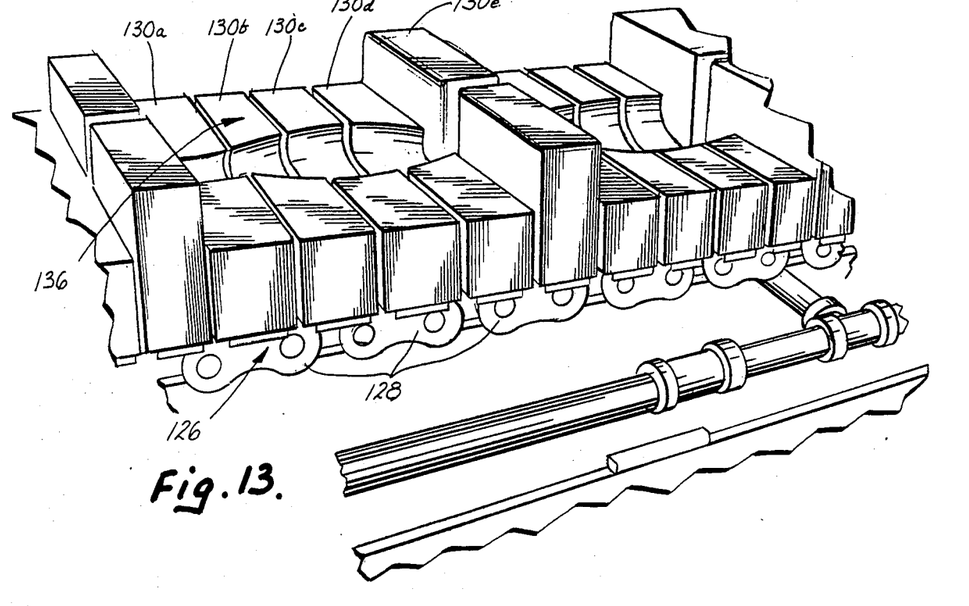
FIG. 13 is a fragmentary, perspective view of a portion of an upper conveyor assembly incorporated in the splitter of FIG. 1.
Figure 14:
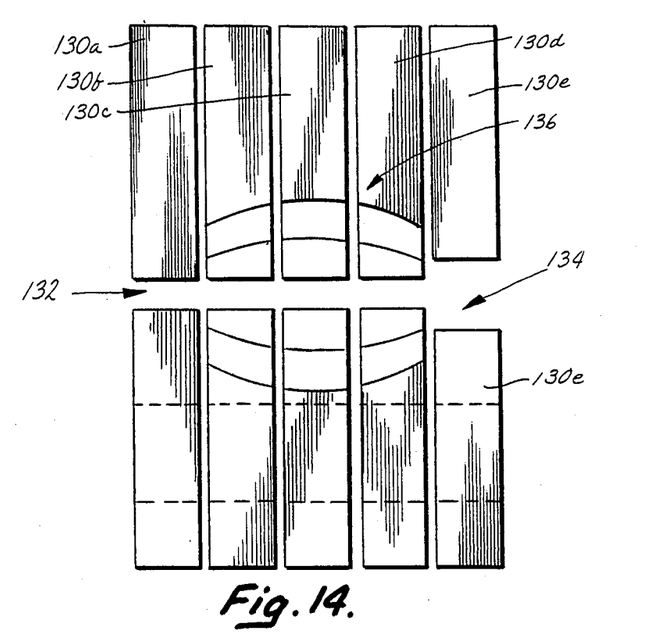
FIG. 14 is a top, plan view of an upper conveyor block set.
Figure 15:
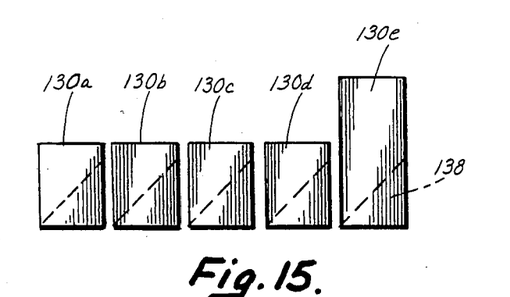
FIG. 15 is a side, elevational view of the block set of FIG. 14.
Figure 16:
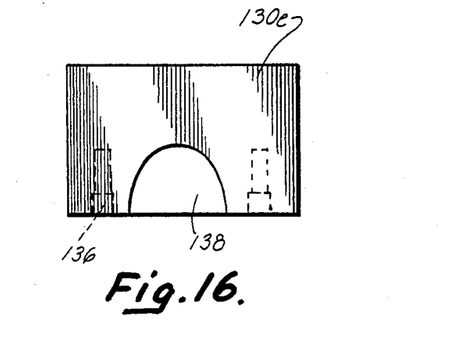
FIG. 16 is a front, elevational view of a pusher block incorporated in the set of FIG. 14.

Gizzards 20 placed within pockets 68 defined by the sets of blocks 66 on the lower conveyor 14 are conveyed into the housing defined by enclosure panels 48. The gizzards are moved into position to be engaged by an upper conveyor subassembly 120 (FIGS. 1 and 2). Upper conveyor subassembly 120 includes drive sprockets 122 suitably supported on the frame 40 in spaced, opposed relationship. An upper chain idler arm 124 is supported on frame 40 in spaced relationship to sprockets 122. Extending around sprockets 122 and chain idler 124 are endless roller chains 126, as schematically shown in FIG. 2. Chain 126 also includes "K-1 attachment". Ears or tabs 128 (FIGS. 13 and 22) are formed on the side plates of the roller chain 126. Attached to chain 126 are upper conveyor blocks or flights 130a, 130b, 130c, 130d and 130e. Blocks 130a–130e, as seen in FIGS. 13–16, are formed as right and left-hand sets spaced by a slot 132. The spacing laterally between blocks 130e of each overall set of blocks is greater than slot 132 and defines a gap 134, as described below. As seen in FIGS. 13 and 14, the mirror image blocks 130a–130d define an upper gizzard pocket 136. As with the blocks or flights of the lower conveyor, blocks 130a–130e are formed from a UHMW biologically inert material. The blocks have a generally rectangular configuration in plan. The individual blocks are formed through a milling operation and then cut to form the two mirror image sets, as illustrated in FIG. 14. Slot 132 is 0.375 inch and is adapted to receive a cutting knife, as described below. The overall length dimension of each block 130a–130e prior to cutting is 6.875 inches. The blocks 130a–130d have a height of 1.062 inches and a width of 0.844 inch. As shown in FIG. 16, each of the blocks is formed with mounting apertures 136 to permit the blocks to be attached to tabs 128 on endless chain 126. Pocket 136 has a depth dimension similar to the pockets defined by the blocks on the lower chain. Blocks 130e are pusher blocks, as described below. These blocks have an overall height dimension of 1.9 inches. In addition, each of the blocks 130a–130e are formed with a spray relief 138 for passage of flushing water.

Figure 17:
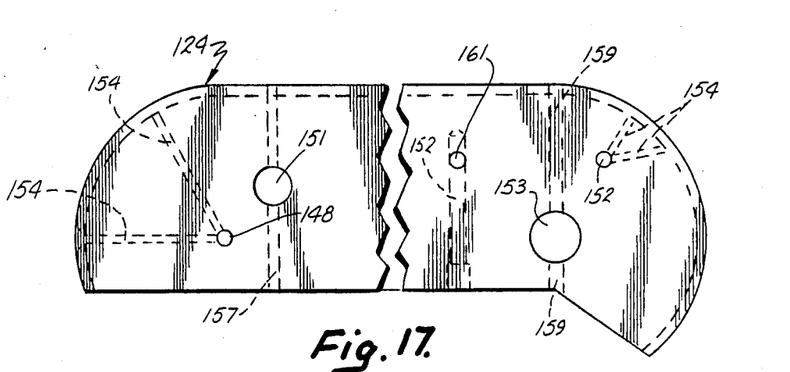
FIG. 17 is a side, elevational view of an upper conveyor chain idler arm incorporated in the gizzard
Figure 18:
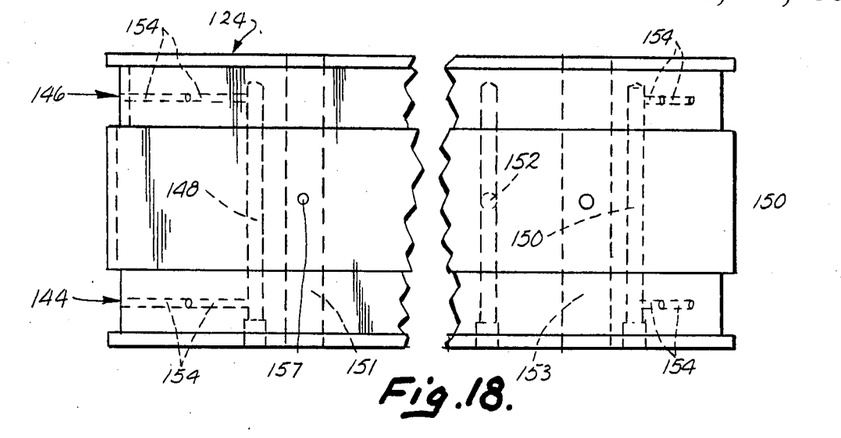
FIG. 18 is an end, elevational view of the idler arm of FIG. 17.

Upper chain idler arm 124 is illustrated in FIGS. 7 and 18. Idler 124 is fabricated from a suitable UHMW material or equivalent Nylon. Idler 124 includes a central body portion which defines grooves 144, 146. Chains 126 supporting the upper conveyor flights or blocks ride within the grooves 144, 146. Idler 124 is formed with internal passages or bores 148, 150, 151, 152 and 153. Bores 148, 150 are connected to spray passages 154 which open up into grooves 144, 146. Bores 151 and 153 open into spray ports 157, 159, respectively. Bore 152 opens into a port 161. Passages 148, 150, 151, 152 and 153 are connected to a source of water under pressure. As the upper conveyor belt defined by the roller chain and individual blocks and flights passes over the idler arm, the water spray flushes and cleans the subassembly.

Figure 20:
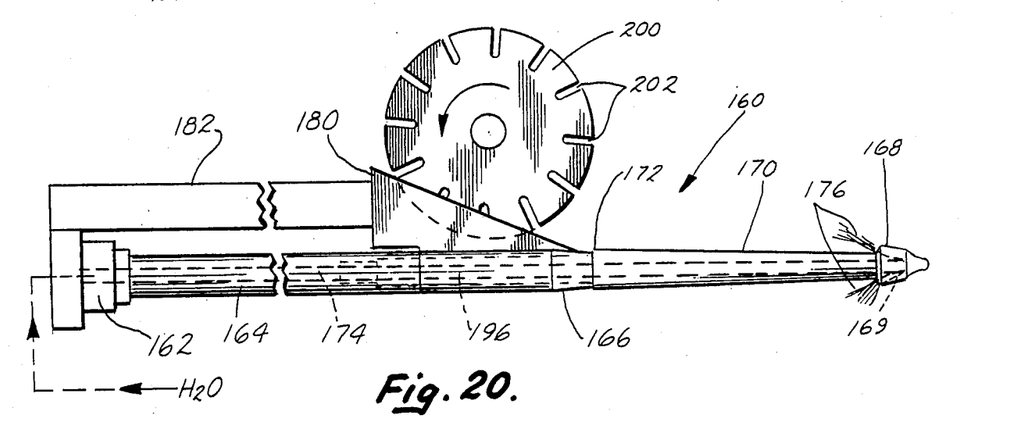
FIG. 20 is a side, elevational view of the rotating probe, knife guide and knife assembly.

The lower conveyor and upper conveyor cooperate to transport individual gizzards into contact with the cleaning and cutting subassembly 18. Subassembly 18 includes a rotary probe 160 (FIGS. 19, 20, 21 and 22). Probe 160 is supported on a bearing 162 and driven by a suitable motor 163. Probe 160 is formed with two tubular sections 164 and 166. Section 164 has a diameter of approximately 1 inch. Probe portion 166 includes a generally nipple-shaped forward head 168 and a tapered frusto-conical portion 170. In a presently existing embodiment, head 168 has a maximum diameter of 0.75 inch and a length of approximately 0.875 inch terminating in a nose which is generally spherical in shape having a radius of 0.125 inch. Tapered portion 170 has a diameter at head 168 of 0.5 inch. The diameter of the tapered portion at its rear end 172 is 0.75 inch. Probe portions 164, 166 are threadably interconnected. The portions define a central throughbore or water passage 174. Passage 174 terminates in a pair of nozzles 176 which open generally rearwardly of head 168 at a beveled surface 169. Passage 174 is connected to a suitable source of water under pressure, as schematically illustrated in FIG. 20.

In operation, as explained in more detail below, the water exits the nozzle outlets 176 at approximately 430 psi. The probe sections are formed from hardened stainless steel and are smooth or polished. Supported on probe portion 160 rearwardly of tapered section 170 is a knife guide 180. Guide 180 is joined to a support bar 182 which in turn is joined to the bearing or support subassembly 162 (FIGS. 19 and 20).

Figure 25:
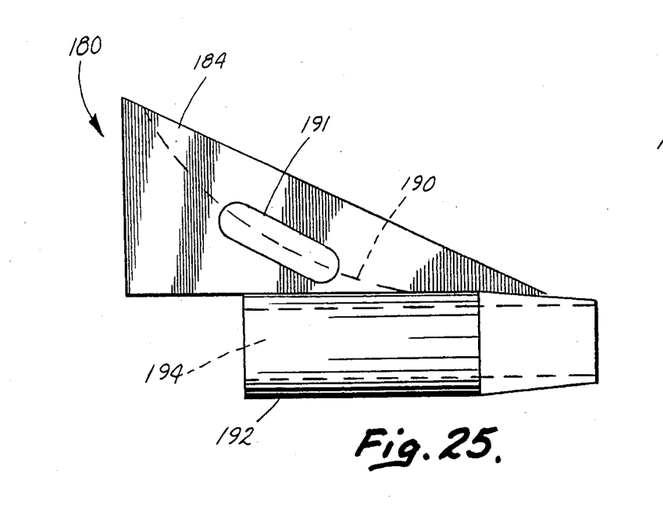
FIG. 25 is a side, elevational view of the knife guide.
Figure 26:
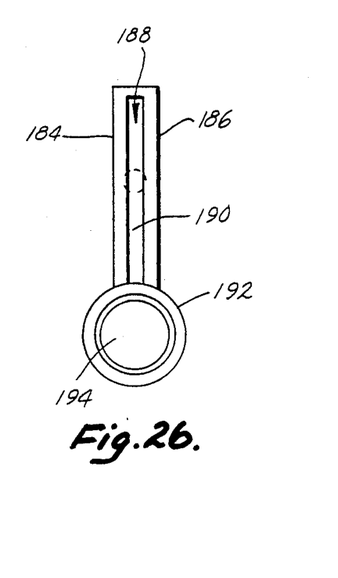
FIG. 26 is a front, elevational view of the knife guide.

As seen in FIGS. 20, 25 and 26, guide 180 includes spaced sides 184, 186. Sides 184, 186 define a slot 188 which has a curved bottom wall 190 and a through slot 191. Sides 184, 186 of the guide have a generally triangular shape in side elevation. These portions are joined to a tubular mount 192 which defines a throughbore 194. In an existing embodiment, guide 180 is fabricated from UHMW 1900. It may be made from an equivalent abrasion resistant material, such as Nylon 101. Bore 194 is dimensioned to receive a rear portion of probe section 166. A knife guide lubrication hole 196 is formed in probe section 166. Water provides lubrication, therefore, between the rotating probe and the inner surface of bore 194.

As schematically illustrated in FIG. 20 and as also seen in FIG. 2, a rotary knife blade 200 is mounted on frame 40 so as to be positionable within groove 188 of knife guide 180. Knife blade 200 is formed with a plurality of serrations 202 equally spaced around its perimeter. In a presently existing embodiment, the rotary knife blade 200 has a diameter of 6.25 inches and is formed with 12 serrations 202, each 0.25 inch wide and approximately 1 inch deep.

Figure 23:
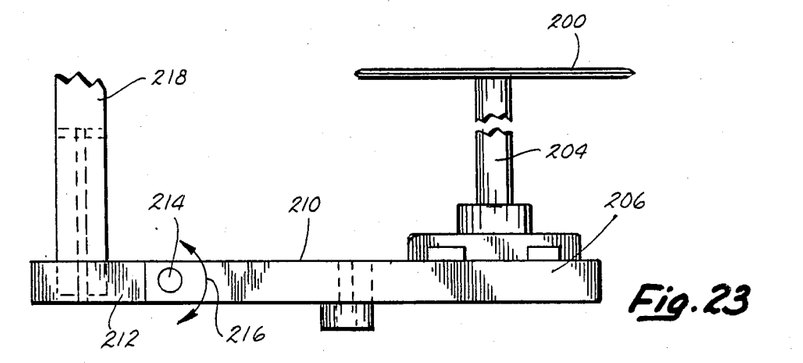
FIG. 23 is a fragmentary, top, plan view of the knife assembly.
Figure 24:
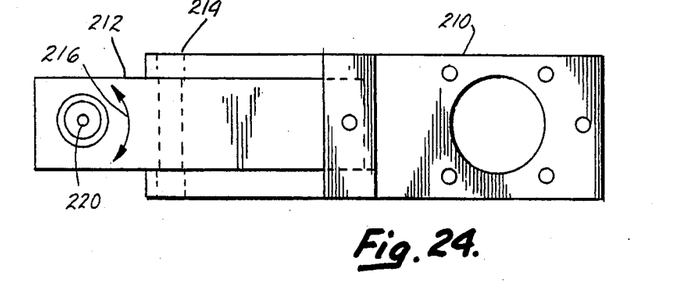
FIG. 24 is a side, elevational view of the mounting arrangement for the knife assembly.

Blade 200 is supported on a shaft 204 driven by a suitable motor 206 (FIG. 23). The knife blade, shaft and motor are supported on a mounting plate 210. As shown in FIGS. 23 and 24, plate 210 is hingedly connected to a plate 212 by a hinge pin 214. As a result, plate 210 can pivot in an in and out fashion in the direction of arrow 216. Plate 212 is in turn pivoted or hinged to a support shaft 218 through a pin 220. As a result, mounting plate 212 and hence plate 210 may pivot vertically with respect to knife guide 180, as schematically illustrated in FIG. 2. The double hinge mounting arrangement permits the knife blade to be rotated away from guide 180 and then outwardly from the interior of the housing for cleaning and maintenance purposes.

Figures 21, 22:
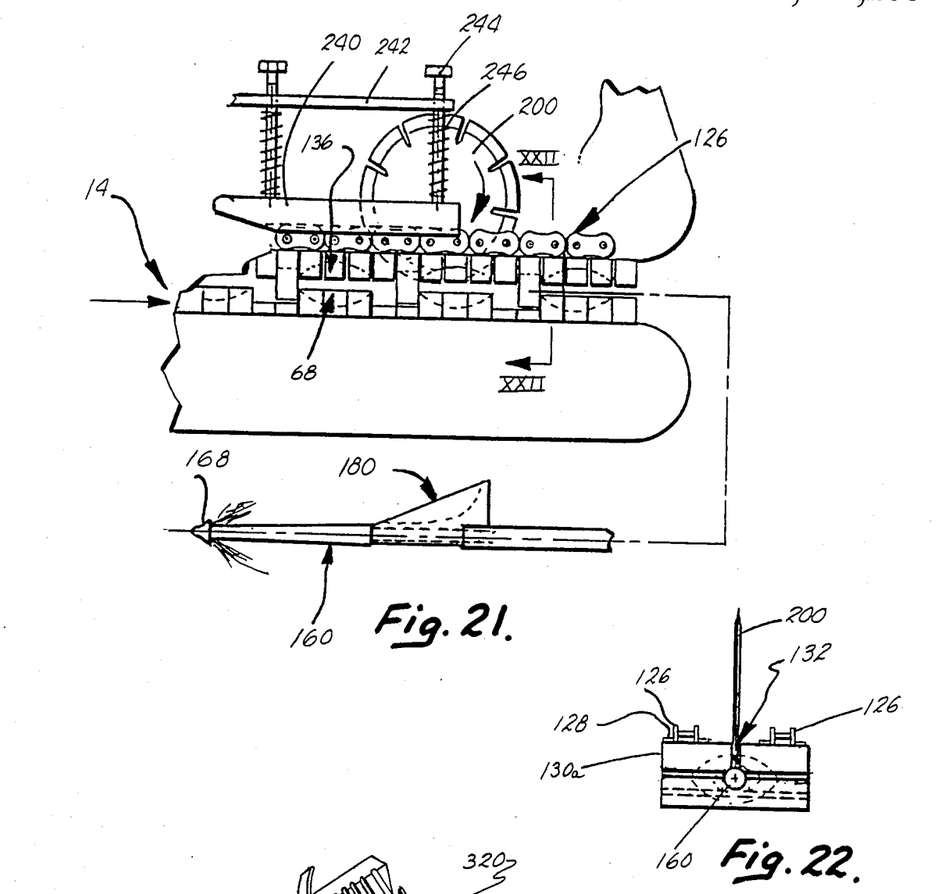
FIG. 21 is a fragmentary, exploded, side, elevational view showing a portion of the upper and lower conveyor assemblies incorporated in the splitter of FIG. 1.
FIG. 22 is a cross-sectional view taken generally along line XXII—XXII of FIG. 21.

FIGS. 21 and 22 illustrate the relationship between the upper and lower conveyors in the area of the rotating probe. As shown in FIG. 21, lower conveyor 14 is positioned so that the gizzard pockets 68 are in opposed relationship to gizzard pockets 136. The pockets are closed by pusher blocks 130e of the upper conveyor. Probe 160 extends down the longitudinal centerline of the juxtaposed conveyors. A pressure block 240 is spring biased into engagement with the undersurface of the conveyor belt of the upper conveyor assembly at the area of probe 160. Pressure block 240 is supported from a mounting plate 242 by adjustment bolts 244. Coil springs 246 spring bias or load block 240 into engagement with the undersurface of the upper conveyor belt. The spacing between the blocks is such that probe 160 will be received by the cooperating conveyor runs and the runs may pass by the probe. As seen in FIG. 22, knife blade 200 extends through slot 132 and slot 134 defined by the flights or blocks 130a–130e of the upper conveyor. Endless chains 126 pass by on either side of rotary knife 200.

In operation, workers remove gizzards and manually place them onto the lower conveyor 14. In the alternative, the gizzards could be automatically placed on the conveyor within a respective gizzard pocket. Lower conveyor 14 is elongated with respect to upper conveyor 120 to provide space for the workers. The gizzards are oriented within the individual gizzard pockets so that their opening faces towards end 168 of probe 160. A suitable motor, transmission and drive arrangement, schematically illustrated and designated by the numeral 280 (FIG. 1), synchronizes operation of the upper and lower conveyors. Operation of the conveyors is synchronized so that the flights or sets of blocks will be positioned in opposed relationship, as shown in FIG. 21.

As the gizzards approach head 168 of rotary probe 160, high pressure water emanating from the nozzles in the probe head will clean the interior of the gizzard. The upper run of the lower conveyor and the lower run of the upper conveyor cooperate to prevent rotation of the gizzards placed within the pockets 68, 136. Blocks 130e of the upper conveyor assist in pushing the gizzard over the configured head 168. The pressure block 240 increases the pressure or force of engagement and prevents rotation of the gizzard within the pocket. The high pressure water spray emanating from the nozzles in head 168 remove grit, dirt and the like from the interior of the gizzard. In addition, the rotary motion of the probe assists in the cleaning and washing function.

Upon further conveyor movement, the gizzard is forced along probe 160 and into contact with knife guide 180. Rotary knife 200 will then split or slit the gizzard. Through proper placement on the lower conveyor, the gizzards are split in a so-called butterfly cut. The upper and lower conveyors cooperate to hold the position of the gizzard. The positioning of the knife and the guide insure that one basic position on the gizzard is cut. The knife cuts one of the two tendons and the meaty part of the lobe is left intact. This results in a more desirable looking piece. As the conveyor continues to advance, the gizzard is moved along the probe until it exits the splitter subassembly. Although the probe head and shaft are smooth, some gizzard liner removal will be achieved during operation of the splitter.

DEFATTER AND TRANSFER CONVEYOR

As seen in FIGS. 1 and 2, defatter 22 includes a drip pan 290, a top cover 292, an inlet chute 294 and a perforated insert or bottom pan 296. Positioned around the interior surface of cover 292 are a plurality of conventional, flexible picker fingers 298. Rotatably supported within the chamber defined by cover 292 and insert 296 is a frame 300. Frame 300 is generally rectangular in configuration and is secured to a rotating shaft 302. Positioned on side members 304 of frame 300 are a plurality of picker fingers 306. A manifold 308 is connected to cover 292. Water under pressure is sprayed into the interior of the defatter through manifold 308. Shaft 302 of the paddle subassembly is driven by a motor 310.

Figure 27:
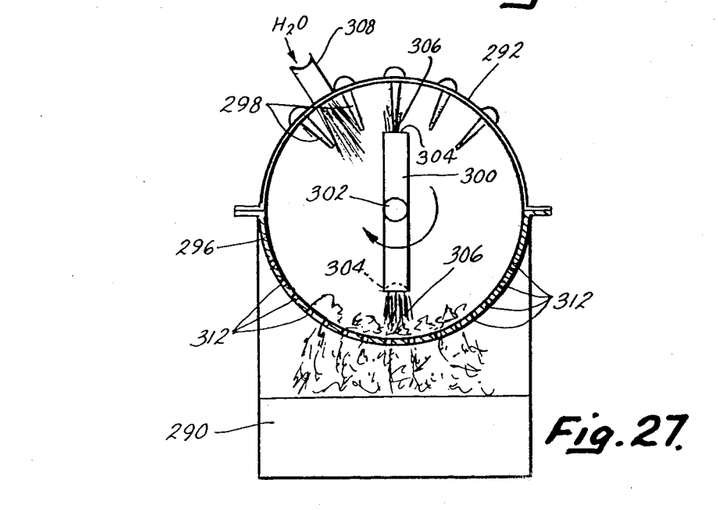
FIG. 27 is an enlarged cross-sectional view of the defatter included in the apparatus of FIG. 1.

In operation, gizzards which have been split by subassembly 12 fall off of the lower conveyor 14 and into the inlet chute 294 of defatter 22. As schematically shown in FIG. 27, the gizzards are moved around the interior of the defatter through contact with the rotating picker fingers 306 and the stationary fingers 298. Fat, gravel, grit and the like pass through perforations 312 formed in insert 296 under the combined action of the picker fingers and the water spray. The debris is then discharged out the drip pan 290. Gizzards are propelled through the defatter 22 through the actions of the rotating picker fingers. They are discharged at end 24 onto transfer conveyor 26. Transfer conveyor 26 is a belt conveyor. Slats 316 on the belt define pockets for receipt of the gizzards. Conveyor 26 raises the gizzards to an inlet 320 of the gizzard peeler subassembly 28.

GIZZARD PEELER SUBASSEMBLY

Figure 28:
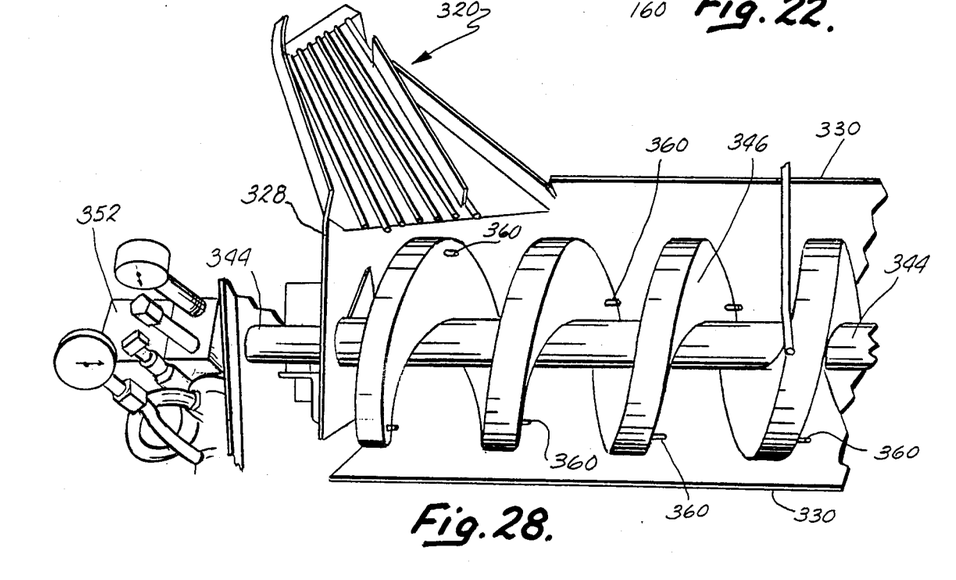
FIG. 28 is a fragmentary, perspective, top view showing a portion of the gizzard peeler of FIG. 1.
Figure 29:
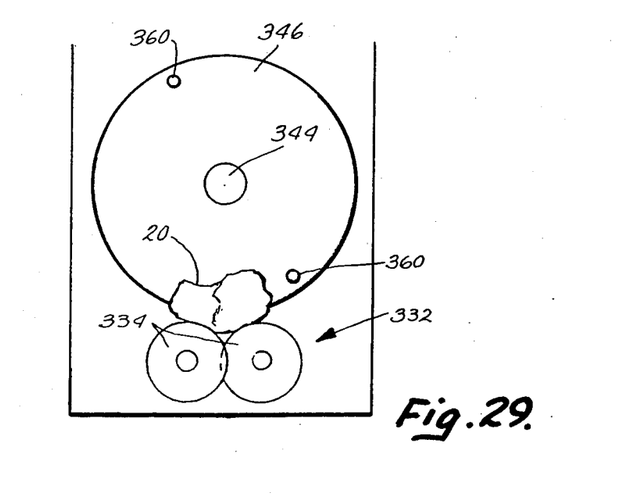
FIG. 29 is a schematic, cross-sectional view of the gizzard peeler.

Gizzard peeler subassembly 28 includes a support frame 322. Mounted on frame 322 is an elongated trough or box 324. Box 324 includes a bottom 326, an end 328 and sides 330 (FIGS. 1, 28 and 29). Rotatably supported within trough 324 in spaced, parallel relationship with the bottom 326 are a plurality of sets of gizzard peeler rollers 332. Each set 332 of peeler rollers includes a pair of counter-rotating, helically cut, intermeshing gizzard peeler rollers 334. Rollers 334 are conventional in nature. The roller sets are supported and interconnected longitudinally of trough 324 at bearing blocks 336, as schematically shown in FIG. 1. The ends of the rollers may be connected in a single tongue and groove fashion. The peeler rollers are driven by a motor 338.

Mounted in juxtaposed, parallel relationship to the peeler rollers is an auger 342. Auger 342 includes a shaft 344 and a continuous helical flight 346. Shaft 344 is supported at its ends 348, 350 by suitable bearings. Shaft 344 is driven by an auger drive motor 352. Positioned at equally spaced points along the helical flight 346 of auger 342 are longitudinally extending pins 360. As illustrated in FIG. 29, auger 342 is positioned with respect to the gizzard peeler rollers so that pins 360 will contact a gizzard 20 upon rotation of the auger. As the pins contact the gizzards, they will flip them on the peeler rollers 334. This flipping action insures that the inner liner of the gizzard is brought into appropriate contact with the peeler rollers so that it may be pulled from the muscle portion of the gizzard The auger controls the rate at which the gizzards 20 move across or along the peeler rollers. Hence, the amount of time that the gizzards are in contact with the peeler rollers is controlled. In addition, the auger will convey or transport the gizzards over the bearing blocks which separate the individual roller sets 332. Auger 342 is best employed to retard the movement of the gizzards as they traverse the peeler rollers. Trough 324 is positioned at an angle of approximately 30 degrees from horizontal. The angular relationship has an effect upon the movement of the gizzards on the rollers. The gizzards are kept in contact with flight 346 and are in effect pushed across the rollers. This also insures that pins 360 contact the gizzards to flip them.

Figure 30:
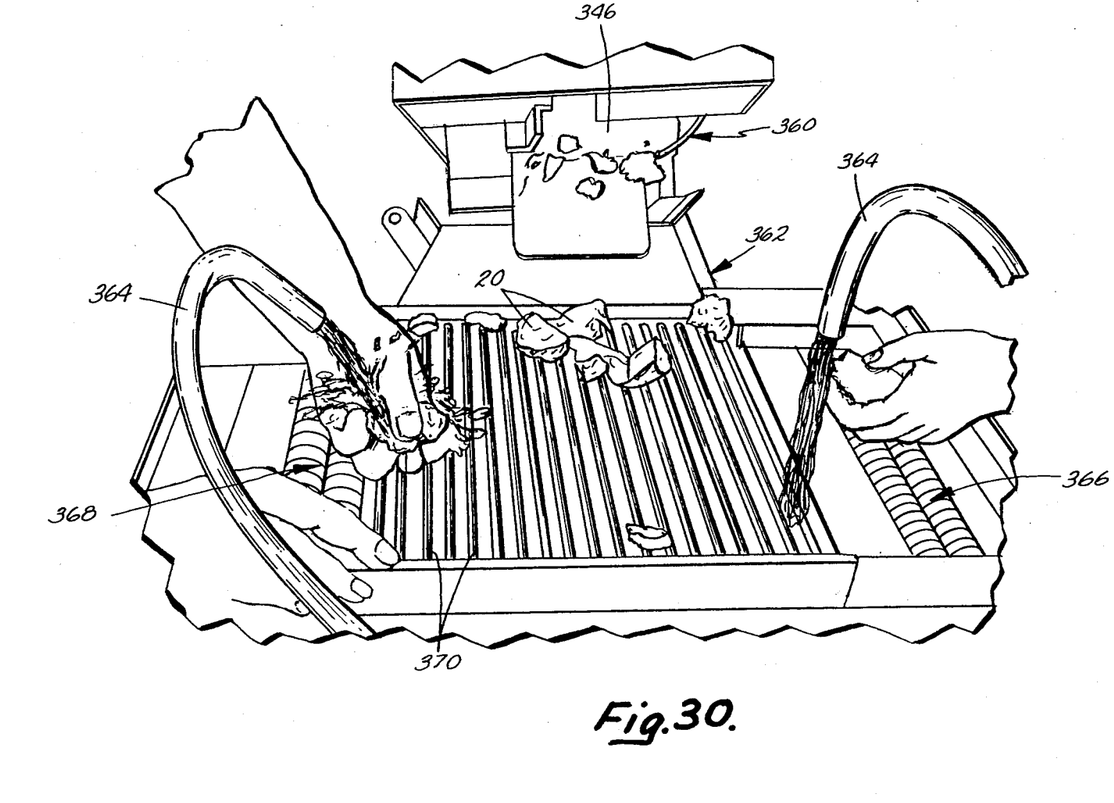
FIG. 30 is a perspective, fragmentary view showing the discharge end of the gizzard peeler.

As seen in FIGS. 1 and 30, bottom 326 of the trough at a discharge end defines an opening 360. Peeled gizzards are discharged from the peeler onto an inspection table 362 positioned over a drip pan 363. Water outlets 364 are provided at the table. Mounted within the table structure are individually powered peeler roller sets 366, 368. Table 362 has a grill-like surface defined by a plurality of rods 370. Workers positioned at either side of the table may visually inspect the processed gizzards 20 discharged from peeler 28. If necessary, finish peeling or removal of any of the remaining liner may be accomplished at the peeler rollers 366, 368. After any such final processing, the gizzards may be placed onto a suitable outfeed conveyor (not shown).

The process and apparatus in accordance with the present invention efficiently and economically harvests gizzards from poultry such as turkeys. The gizzards are cleaned, split and the inner liner automatically removed. Minimal, if any, finish or manual processing is required. The splitting, defatting and peeling operations are essentially automatic. The spray manifolds incorporated in the splitter greatly assist in flushing, cleaning and maintaining the smooth operation of the equipment. Such reduces downtime for maintenance and increases production rates. Mutilation of the gizzards is minimized, as is the rejection rate. The peeler achieves efficient and substantially complete liner removal. The auger, in combination with the pins, insures that the gizzards are maintained in contact with the peeler rollers for the requisite amount of time. Flipping of the gizzards insures that the liner comes into contact with the rollers for removal.

In view of the above description, those of ordinary skill in the art may envision various modifications which would not depart from the inventive concepts disclosed. It is, therefore, expressly intended that the above description should be considered as only that of the preferred embodiments. The true spirit and scope of the present invention may be determined by reference to the appended claims.

The embodiments of the invention in which an exclusive property or privilege is claimed are defined as follows:

1. Apparatus for processing poultry gizzards, comprising:
    a gizzard splitter, said splitter including an elongated lower conveyor which defines tandemly arranged lower pockets, an upper conveyor which defines tandemly arranged upper pockets, a rotating probe positioned between opposed runs of said conveyors, said probe defining water nozzles, and knife means adjacent said conveyors for splitting a gizzard held within the pockets of said conveyors and moved over said probe;
    a gizzard defatter means positioned at a discharge end of said gizzard splitter for receiving a split gizzard from said gizzard splitter and removing fat and debris from the gizzard; and
    a gizzard peeler means positioned to receive a gizzard from said defatter for peeling a lining from said gizzard, said peeler means including at least one set of gizzard peeler rollers, an auger means positioned adjacent and parallel to s id peeler rollers for moving the gizzard along said peeler rollers, an auger drive for rotating said auger and a peeler drive for rotating said peeler rollers, said auger controlling the rate at which the gizzards move along said peeler rollers.

2. Apparatus as defined by claim 1 wherein said lower conveyor of said gizzard splitter comprises:
    an elongated frame;
    a forward idler mounted on said frame;
    a rear sprocket mounted on said frame;
    an endless chain extending around said forward idler and said rear sprocket to define an upper run and a lower run; and
    spray means on said frame at said forward idler for spraying and cleaning said lower conveyor.

3. Apparatus as defined by claim 2 wherein said spray means comprises:
    a curved spray bar having an inlet connectable to a source of pressurized fluid, said bar extending around said forward idler.

4. Apparatus as defined by claim 3 wherein said lower conveyor further includes a plurality of sets of blocks, each block being secured to said endless chain and said sets being arranged in tandem, said sets of blocks each including a plurality of separate blocks which define one of said lower pockets.

5. Apparatus as defined by claim 1 wherein said upper conveyor comprises:
    a drive sprocket mounted on said frame;
    a chain idler arm mounted on said frame;
    an endless chain extending around said sprocket and said chain idler arm; and
    a plurality of sets of upper blocks, each upper block being secured to said endless chain and said sets of upper blocks being arranged in tandem, said sets of upper blocks each including a pusher block and a plurality of upper blocks which define one of said upper pockets.

6. Apparatus as defined by claim 5 wherein said chain idler arm defines a plurality of spray passages and ports positioned to spray and clean said endless chain and said upper blocks with a pressurized fluid.

7. Apparatus as defined by claim 4 wherein said upper conveyor comprises:
    a pair of spaced drive sprockets mounted on said frame;
    a chain idler arm mounted on said frame;
    a pair of endless chains, each chain extending around one of said sprockets and said chain idler; and
    a plurality of sets of upper blocks, each upper block being secured to one of said endless chains and said sets of upper blocks being arranged in tandem and defining a longitudinally extending knife slot, said sets of upper blocks each including a pusher block and a plurality of blocks which define one of said upper pockets.

8. Apparatus as defined by claim 7 wherein said chain idler arm defines a plurality of spray apertures positioned to spray and clean said endless chain.

9. Apparatus as defined by claim 1 wherein said rotating probe includes:
    an elongated shaft defining a fluid passage having an inlet; and
    a generally nipple-shaped head having a plurality of rearwardly directed, angled nozzles connected to said fluid passage, said shaft defining a tapered portion extending rearwardly from said head to said knife.

10. Apparatus as defined by claim 9 further including a knife guide defining a central bore, said probe extending through said bore, said knife guide further defining an elongated slot for receipt of said knife.

11. Apparatus as defined by claim 10 further including knife mounting means on said frame for adjustably mounting said knife for movement from an operative position within said slot of said knife guide to an inoperative position.

12. Apparatus as defined by claim 8 wherein said rotating probe includes:
    an elongated shaft defining a fluid passage having an inlet; and a generally nipple-shaped head having a plurality of rearwardly directed, angled nozzles connected to said passage, said shaft defining a tapered portion extending rearwardly from said head to said knife.

13. Apparatus as defined by claim 12 further including a knife guide defining a central bore, said probe extending through said bore, said knife guide further defining an elongated slot for receipt of said knife.

14. Apparatus as defined by claim 13 further including knife mounting means on said frame for adjustably mounting said knife for movement from an operative position within said slot of said knife guide to an inoperative position.

15. Apparatus as defined by claim 1 wherein said gizzard peeler means further includes:
an elongated trough having an inlet end and a discharge end, sides and a bottom, said peeler rollers extending along said bottom, said trough being angled vertically from the inlet end to the discharge end with the discharge end defining an opening;
an inspection table extending from said discharge end; and
a set of finish peeler rollers at said inspection table.

16. Apparatus as defined by claim 1 wherein said gizzard peeler means further includes a plurality of pins on said auger, said pins engaging the gizzards and flipping the gizzards on said peeler rollers.

17. Apparatus as defined by claim 15 wherein said gizzard peeler means further includes a plurality of pins on said auger, said pins engaging the gizzards and flipping the gizzards on said peeler rollers.

18. Apparatus as defined by claim 14 wherein said gizzard peeler means further includes:
an elongated trough having an inlet end and a discharge end, sides and a bottom, said peeler roller extending along said bottom, said trough being angled vertically from the inlet end to the discharge end, the discharge end defining an opening;
an inspection table extending from said discharge end; and
a set of finish peeler rollers at said inspection table.

19. Apparatus as defined by claim 18 wherein said gizzard peeler means further includes a plurality of pins on said auger, said pins engaging the gizzards and flipping the gizzards on said peeler rollers.

20. Apparatus as defined by claim 19 further including a transfer conveyor disposed between said defatter means and said gizzard peeler means for transferring gizzards from said defatter means to the inlet of said peeler means.

21. A gizzard cleaning and splitter device comprising:
an elongated frame;
a lower conveyor on said frame, said lower conveyor defining an elongated upper run having a plurality of gizzard receiving pockets;
an upper conveyor on said frame, said upper conveyor defining a lower run which extends in opposed, spaced, parallel relationship with a portion of said upper run of said lower conveyor, said lower run defining a plurality of gizzard receiving pockets and a pusher which cooperates with the pockets of said lower conveyor to transport gizzards;
an elongated, generally tubular probe positioned between said runs of said upper and lower conveyors so that a gizzard within one of said pockets is pushed over said probe by said conveyors, said probe including a generally nipple-shaped head defining cleaning nozzles;
drive means connected to said probe for rotating said probe as a gizzard is pushed therealong;
a knife guide on said probe, said guide being generally triangular in shape and defining a knife slot;
a rotating knife; and
knife mounting means on said frame for adjustably mounting said rotating knife for movement from a first operating position within said knife slot and an inoperative cleaning position.

22. A device as defined by claim 21 wherein said lower conveyor comprises:
a forward idler wheel defining a peripheral groove;
a spray bar disposed within said groove and defining a plurality of spray openings;
a rear sprocket on said frame; and
an endless chain extending around said idler wheel and said rear sprocket.

23. A device as defined by claim 21 wherein said lower conveyor further comprises:
a plurality of sets of blocks attached to said endless chain, each set of blocks defining one of said gizzard pockets.

24. A device as defined by claim 23 wherein said sets of blocks each define a generally planar recess adjacent an end of said pocket.

25. A device as defined by claim 24 wherein said upper conveyor includes a plurality of sets of upper blocks, each set of upper blocks defining a gizzard pocket and including a pusher block, said upper conveyor positioned so that said pusher block may extend into one of said planar recesses of said sets of blocks of said lower conveyor.

26. A device as defined by claim 25 wherein said upper conveyor further includes
a pair of drive sprockets;
a chain idler arm; and
a pair of endless chains each extending around one of said drive sprockets and said chain idler, said sets of upper blocks being secured to said chains, said chain idler arm defining spray passages and outlets positioned to direct a cleaning fluid against said chains and blocks.

27. A device as defined by claim 21 wherein said knife mounting means comprises:
a mounting bar supporting said knife; and
a double hinge means connected to said mounting bar for connecting said bar to said frame, said knife means permitting pivotal movement of said knife towards and away from said guide slot about a horizontal axis and pivotal movement about a vertical axis.

28. A device as defined by claim 26 wherein said knife mounting means comprises:
a mounting bar supporting said knife; and
a double hinge means connected to said mounting bar for connecting said bar to said frame, said knife means permitting pivotal movement of said knife towards and away from said guide slot about horizontal axis and pivotal movement about a vertical axis.

29. A device as defined by claim 28 wherein each of said sets of upper blocks defines a longitudinally extending slot through which said knife passes.

30. A gizzard peeler apparatus for removing the lining from a gizzard, said apparatus comprising:
a frame;

a pair of elongated gizzard peeler rollers extending along said frame;

control means supported on said frame and extending in opposed, spaced, parallel relationship with said peeler rollers for controlling movement of a gizzard along said rollers;

drive means for rotating said peeler rollers; and gizzard flipper means on said control means for flipping a gizzard on said peeler rollers.

31. An apparatus as defined by claim 30 wherein control means comprise an elongated auger and said gizzard flipper means includes a plurality of pins on said auger, said pins positioned to engage the gizzard and flip the gizzard on said peeler rollers.

32. An apparatus as defined by claim 31 further including a housing, said control means and said rollers extending within said housing.

33. An apparatus as defined by claim 32 wherein said housing is angled upwardly from an inlet end to a discharge end and wherein said apparatus further includes an inspection table at said discharge end and finish peeler rollers at said inspection table.

34. An apparatus as defined by claim 33 further including a plurality of sets of gizzard peeler rollers connected in tandem relationship within said housing.

35. An apparatus as defined by claim 34 wherein said drive means includes a peeler roller motor and said control means further includes an auger drive motor.

36. A gizzard cleaning and splitter device comprising:

an elongated frame;

a lower conveyor on said frame, said lower conveyor defining an elongated upper run having a plurality of gizzard receiving pockets, said lower conveyor including a forward idler wheel defining a peripheral groove and a spray bar disposed within said groove for spraying the conveyor;

an upper conveyor on said frame, said upper conveyor defining a lower run which extends in opposed, spaced, parallel relationship with a portion of said upper run of said lower conveyor, said lower run defining a plurality of gizzard receiving pockets and pusher which cooperates with the pockets of said lower conveyor to transport gizzards, said upper conveyor further including a drive sprocket, an idler, an endless chain extending around said sprocket and said idler and spray means at said idler for spraying and cleaning said upper conveyor;

an elongated, generally tubular probe positioned between said runs of said upper and lower conveyors so that a gizzard within one of said pockets is pushed over said probe by said conveyors, said probe including a generally nipple-shaped head defining cleaning nozzles;

knife means adjacent said probe for slitting a gizzard on said probe; and drive means connected to said probe for rotating said probe as a gizzard is pushed therealong.

37. A device as defined by claim 36 wherein said lower conveyor comprises:

a rear sprocket on said frame; and an endless chain extending around said idler wheel and said rear sprocket.

38. A device as defined by claim 37 wherein said lower conveyor further comprises:

a plurality of sets of blocks attached to said endless chain, each set of blocks defining one of said gizzard pockets.

39. A device as defined by claim 38 wherein said sets of blocks each define a generally planar recess adjacent an end of said pocket.

40. A device as defined by claim 39 wherein said upper conveyor includes a plurality of sets of upper blocks, each set of upper blocks defining a gizzard pocket and including a pusher block, said conveyor positioned so that said pusher block extends into one of said planar recesses of said sets of blocks of said lower conveyor.

41. A method of processing poultry gizzards comprising the steps of:

placing gizzards onto the run of a lower conveyor;

conveying the gizzards over a rotating probe which has a head defining spray nozzle;

spraying the interior of the gizzards with pressurized water from the nozzles;

splitting the gizzards with a knife while on the probe;

passing the gizzards through a defatter;

transferring the gizzards to a peeler for removal of the gizzard liner;

removing the liner from the gizzards by placing the gizzards in contact with counterrotating, helically cut rollers, controlling the rate of movement of the gizzards along the rollers and flipping the gizzards while in contact with the rollers; and inspecting the gizzards after removing the gizzards from the rollers.

* * * * *

UNITED STATES PATENT AND TRADEMARK OFFICE
CERTIFICATE OF CORRECTION

PATENT NO. : 4,815,166
DATED : March 28, 1989
INVENTOR(S) : Eugene G. Martin et al It is certified that error appears in the above-identified patent and that said Letters Patent is hereby corrected as shown below:

Column 5, line 36
"7" should be --17--.

Column 9, Claim 1, line 55
"sid" should be --said--

Column 13, Claim 36, line 43
after "and" insert --a--

Signed and Sealed this

Sixth Day of February, 1990

Attest:

JEFFREY M. SAMUELS

Attesting Officer     Acting Commissioner of Patents and Trademarks